United States Patent [19]

Sagisaka et al.

[11] Patent Number: 5,990,225

[45] Date of Patent: Nov. 23, 1999

[54] RESIN OF POLYPHENYLENE SULFIDE, POLYETHYLENE GRAFT AND TFE FOR SLIDING MEMBER

[75] Inventors: Kouichi Sagisaka; Mitsuo Sato; Masanori Yamazaki, all of Ibaraki, Japan

[73] Assignee: Mitsubishi Chemical Corporation, Tokyo, Japan

[21] Appl. No.: 08/649,326

[22] Filed: May 17, 1996

[30] Foreign Application Priority Data

May 17, 1995 [JP] Japan .................................... 7-118405

[51] Int. Cl.⁶ ................................ C08K 5/15; C08K 3/04
[52] U.S. Cl. .......................... 524/504; 524/114; 524/496
[58] Field of Search .................................... 524/114, 495, 524/496, 504, 847, 520

[56] References Cited

U.S. PATENT DOCUMENTS 5,149,731  9/1992  Uota ........................................ 524/265
5,160,786  11/1992  Nakai ...................................... 428/323
5,604,285  2/1997  Miyamori ............................... 524/439

FOREIGN PATENT DOCUMENTS 04178497  6/1992  Japan .
0548789  7/1993  Japan .
05202245  8/1993  Japan .

*Primary Examiner*—Christopher Henderson
*Attorney, Agent, or Firm*—Oblon, Spivak, McClelland, Maier & Neustadt, P.C.

[57] ABSTRACT

A resin compound having high slidability is provided, comprising (A) polyphenylene sulfide resin, (B) polyethylene modified with an ethylenic unsaturated carboxylic acid and/or an ethylenic unsaturated carboxylic acid anhydride, (C) a silane coupling agent having an epoxy group, (D) polytetrafluoroethylene and (E) graphite.

17 Claims, 1 Drawing Sheet

RESIN OF POLYPHENYLENE SULFIDE, POLYETHYLENE GRAFT AND TFE FOR SLIDING MEMBER

BACKGROUND OF THE INVENTION

1. Field of the Invention

The present invention relates to a resin composition which provides molded articles having a low friction coefficient and excellent friction resistance characteristics. This resin composition is suitable for sliding members such as gears, bearings and roller idlers.

2. Description of the Related Art

Sliding members have been recently introduced which are made of resins or plastics, among which resinous materials, such as polyacetal and polyamide, are predominant. However, since such materials exhibit certain deficiencies in that their friction resistance is high, the utility of such materials has been limited. Prior art efforts to reduce friction of plastic materials for sliding members included the addition of a lubricating component such as polyphenylene sulfide (PPS) or polytetrafluoroethylene (PTFE) as well as the addition of a reinforcing component such as carbon fiber, potassium titanate whisker and talc (Japanese Patent Publication 5-48789 and Japanese Patent Laid-Open (JP-A) 4-178497). Such materials, however, have not shown a satisfactory performance required for applications under sever conditions.

Addition of polyethylene, modified with an elastomer component such as an acrylate and maleic anhydride, was also proposed for improving impact resistance of a PPS compound that contains an inorganic filler (JP-A 5-202245). However, the use of an elastomer in combination with polyethylene increases the friction coefficient; hence, such modified polyethylene is not suitable for sliding members.

SUMMARY OF THE INVENTION

Accordingly, Applicants have discovered a novel composition with the unexpected performance of high sliding ability (slidability) as compared to above conventional resin compositions. A more complete appreciation of the invention and many of the attendant advantages thereof will be readily obtained as the same becomes better understood by reference to the following detailed description.

Thus, Applicants have found that a resin compound of polyphenylene sulfide has excellent slidability when a certain amount of polyethylene modified with an ethylenic unsaturated carboxylic acid and a certain amount of a silane coupling agent that contains an epoxy group. This discovery has led to the present invention.

An object of the present invention is to provide a slidable resin composition comprising:

(A) 100 parts by weight of polyphenylene sulfide resin, (B) from 1 to 70 parts by weight based on (A) of polyethylene modified with an ethylenic unsaturated carboxylic acid and/or an ethylenic unsaturated carboxylic acid anhydride, and (C) from 0.1 to 10 parts by weight based on (A) of a silane coupling agent having an epoxy group, and further comprising, based on 100 parts by weight of the total of (A), (B) and (C):

(D) from 3 to 70 parts by weight of polytetrafluoroethylene; and (E) from 0.1 to 30 parts by weight of graphite.

The present invention also provides for a molded article that is molded from the slidable resin compound mentioned above.

DESCRIPTION OF THE PREFERRED EMBODIMENTS

Figure 1:
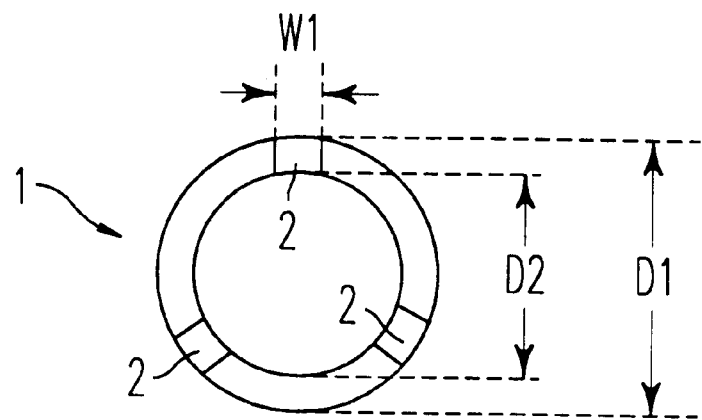
FIG. 1 shows a bottom view of a test ring used for the abrasion test in the Example and Comparative Example.

Having generally described this invention, a further understanding can be obtained by reference to certain specific examples which are provided herein for purposes of illustration only and are not intended to be limiting unless otherwise specified.

Component (A)—Polyphenylene sulfide

Polyphenylene sulfide (PPS) is Component (A) of the present invention, and is a crystalline polymer that has a repeating unit of formula:

$$-(Ar-S)-$$

as the main constituting element, where Ar represents an 1,4-phenylene group, 1,3-phenylene group, or 1,2-phenylene group.

In the present invention the preferred PPS consists of the above repeating units, or contains the above repeating units at not less than 80 molar %, preferably 90 molar %.

When the above repeating units do not represent PPS at substantially 100% amount, the remainder constituent may be a copolymerizable repeating monomer unit; examples of such repeating monomer unit are mentioned below:

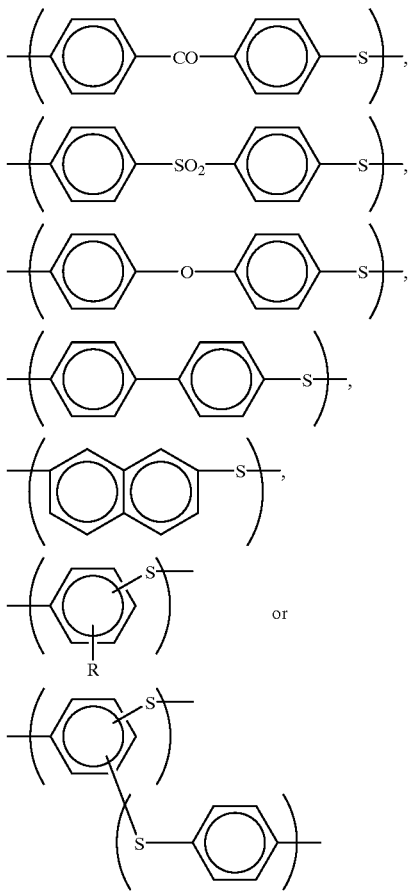

where, R represents an alkyl, alkoxy, nitro or phenyl group. The structure of PPS may be either linear or crosslinked. The viscosity of PPS is not less than 3,000 poises melt viscosity when a load of 20 kg is applied at 300° C.; preferably a viscosity under such condition should not be less than 6,000 poises in view of the excellent abrasion resistance of the composition at the above viscosity range. Commercially available PPS resins may be used in the present invention.

Component (B)—Ethylenic unsaturated carboxylic acid and/or polyethylene modified with an ethylenic unsaturated carboxylic acid anhydride Component (B) of the present invention is a polyethylene modified with an ethylenic unsaturated carboxylic acid and/or an ethylenic unsaturated carboxylic acid anhydride. Component (B) may be a graft copolymer in which an ethylenic unsaturated carboxylic acid and/or an ethylenic unsaturated carboxylic acid anhydride or a derivative thereof is grafted on polyethylene in the presence of a radical initiator; a copolymer of ethylene and an ethylenic unsaturated carboxylic acid and/or an ethylenic unsaturated carboxylic acid anhydride.

The polyethylene to be used in preparation of the graft copolymer, mentioned above, in which the ethylenic unsaturated carboxylic acid and/or the ethylenic unsaturated carboxylic acid anhydride is grafted may be of any type, such as of low density, linear low density, medium density, and high density.

Examples of the ethylenic unsaturated carboxylic acid or the ethylenic unsaturated carboxylic acid anhydride include maleic acid, acrylic acid, itaconic acid, maleic anhydride, and itaconic anhydride.

The content of such ethylenic unsaturated carboxylic acid or the ethylenic unsaturated carboxylic acid anhydride is from 0.05 to 10 parts by weight, preferably from 0.1 to 5 parts by weight, based on 100 parts by weight of the modified polyethylene.

A suitable example to be used in the present invention, of a polyethylene modified with an ethylenic unsaturated carboxylic acid and/or an ethylenic unsaturated carboxylic acid anhydride is a graft copolymer with maleic anhydride. The amount of maleic anhydride to be grafted is from 0.05 to 8 parts by weight based on 100 parts by weight of the modified polyethylene, preferably from 0.05 to 5, parts by weight based on 100 parts by weight of the modified polyethylene. The polyethylene modified with the ethylenic unsaturated carboxylic acid has a viscosity that has a melt flow rate (MFR) of 0.01 to 100, preferably 0.1 to 50 grams per 10 minutes under 2.16 kg at 190° C.

The content of the polyethylene modified with the ethylenic unsaturated carboxylic acid and/or the ethylenic unsaturated carboxylic acid anhydride is from 1 to 70, preferably from 1 to 40, and most preferably from 3 to 30, parts by weight based on 100 parts by weight of the PPS resin. A content exceeding this range will deteriorate the friction resistance significantly, while a lesser content will not lower the friction coefficient.

Component (C)—Silane coupling agent having an epoxy group

Component (C) is a silane coupling agent having an epoxy group. Preferable examples of the coupling agent are silane compounds represented by the following general formula:

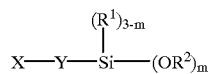

where m is an integer from 1 to 3, X is

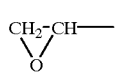 or 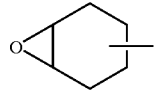

$R^1$ and $R^2$ are the same or different and are represented by an alkyl group having from 1 to 6 carbon atoms, and Y is an alkylene group having from 1 to 6 carbon atoms or the group:

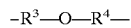

where $R^3$ and $R^4$ are the same or different, and are represented by an alkylene group having from 1 to 6 carbon atoms. A commercially available silane coupling agent may be used in the present invention.

The amount to be added to the composition of the silane coupling agent having an epoxy group is from 0.1 to 10, preferably from 0.5 to 5, parts by weight based on 100 parts by weight of the PPS resin. A content below this range will not result in satisfactory friction resistance because the surface adhesion between the PPS and the polyethylene modified with the ethylenic unsaturated carboxylic acid will be poor. A higher content will cause gas burning when molding because of the decomposition of the silane coupling agent that remains unreacted.

A composition comprising Components (A), (B) and (C) mentioned above has excellent slidability; however, addition of the following components (D) and (E) will further improve the slidability.

Component (D)—Polytetrafluoroethylene

Component (D) is Polytetrafluoroethylene (PTFE), and is prepared by suspension polymerization or emulsion polymerization, for example, of tetrafluoroethylene (TFE). Preferred PTFE for use in accordance with the present invention is in a form of pulverized and classified powder. Preferable average particle diameter of the powder is not more than 100 μm; a range from 1 to 50 μm is most suitable from the standpoint of slidability. All particle sizes are determined by microscopy.

The amount of PTFE powder blended is from 3 to 70, preferably from 5 to 40, parts by weight based on a total of 100 parts by weight of Components (A), (B) and (C). If the PTFE amount is smaller than this range, only a small improvement of the slidability is observed. If the PTFE amount is larger than 70, the abrasion resistance is lowered and the flowability of the composition is lowered, thereby the moldability is deteriorated. Commercial PTFE may be used in the present invention.

Component (E)—Graphite

Component (E) is graphite. The graphite may be artificial or natural. The latter may be flake graphite, earthy graphite or mass graphite. Flake natural graphite of average particle size of not more than 50 μm, preferably not more than 30 μm, is preferred in view of the resulting excellent slidability.

The amount of graphite to be blended is from 0.1 to 30, preferably from 0.5 to 10, parts by weight based on a total of 100 parts by weight of Components (A), (B) and (C). Excessive amounts will deteriorate the abrasion resistance significantly.

Various modifications may be applied to the surface of graphite used in the present invention for the purpose of improving the affinity with the PPS and polyethylene modified with the ethylenic unsaturated carboxylic acid and/or the ethylenic unsaturated carboxylic acid anhydride.

Examples of the materials to be used in the modifications include: various silane coupling agents; a titanium coupling agent; a phenol; acrylic acid; a higher fatty acid such as stearic acid and oleic acid; a glyceride of a higher fatty acid; an amide; a metal salt of a higher fatty acid; a higher alcohol; various waxes; and polyolefin containing a polar group such as polyolefin modified with maleic anhydride and a polyolefin oxide.

Additional components

Additional components may be blended therewith provided that the effect of the invention is not impaired significantly.

Examples of such additional components include a solid lubricant such as molybdenum disulfide, boron nitride and talc; a lubricant oil such as mineral oil, ester oil and silicone oil; and a reinforcing material such as a carbon fiber, an aramid fiber and various whiskers (potassium titanate, aluminum borate, silicon carbide, etc.).

Preparation and molding of kneaded compound

The compound according to the present invention may be prepared by an ordinary kneader such as single-screw extruder, tween-screw extruder, Banbury mixer, roll-mill, and Brabender.

While normally the essential components mentioned above together with additional optional components and a crosslinking catalyst are kneaded and turned into pellets for molding, respective components may be fed directly to a molding machine in which kneading to a compound and molding are performed. Alternatively, a master batch may be prepared preliminarily by kneading component (B) or (C) in a high concentration, and subsequently dilute above component with other components including component (A) for the preparation of a blended compound or for the purpose of direct molding.

The compound according to the present invention can be molded by an ordinary molding machine such as injection molder, extruder, and press. Injection molding, however, is preferable in view of better productivity.

PREFERRED EMBODIMENTS OF THE INVENTION

Referring now to the drawings, wherein like reference numerals designate identical or corresponding parts throughout the several views, and more particularly to FIG. 1 thereof, the present invention is explained in more details by way of examples.

Tables I and II show the result of Examples 1 to 3 and Comparative Examples 1 to 7, respectively.

In respective examples, the following components were used:

PPS1 (polyphenylene sulfide resin):
  T7 manufactured by Tohpren Co., Ltd.
  Melt viscosity: 7,000 poises (at 300° C., 20 kg)
PPS2 (Polyphenylene sulfide resin):
  LD7S manufactured by Tohpren Co., Ltd.
  Melt viscosity: 10,000 poises (at 300° C., 20 kg)
MMPE1 (polyethylene grafted with maleic anhydride):
  A high density polyethylene modified with maleic anhydride. Prepared by graft treatment of a high density (0.97/cm$^3$) polyethylene with maleic anhydride in the presence of benzoyl peroxide. Maleic anhydride content: 0.8% by weight.
  MFR: 1.0 g/10 minutes
MMPE2 (polyethylene grafted with maleic anhydride):
  A linear low density polyethylene modified with maleic anhydride prepared by graft treatment of a linear low density (0.93/cm$^3$) polyethylene with maleic anhydride in the presence of benzoyl peroxide. Maleic anhydride content: 0.8% by weight.
  MFR: 1.0 g/10 minutes
AMPE (ethylene/acrylate/maleic anhydride copolymer)
  BONDINE LX4110 manufactured by Sumitomo Chemical Co., Ltd.
  MFR: 5 g/10 minutes
HDPE (high density polyethylene)
  HY540 manufactured by Dia Polymer KK
  Density: 0.96 g/cm$^3$
  MFR: 1 g/10 minutes
Epoxy silane coupling agent 1
  KBM403 manufactured by Shin-Etsu Silicone Co., Ltd.

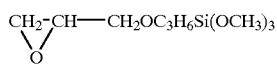

Epoxy silane coupling agent 2
  KBM303 manufactured by Shin-Etsu Silicone Co., Ltd.

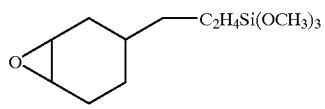

Amino silane coupling agent
  KBM603 manufactured by Shin-Etsu Silicone Co., Ltd.

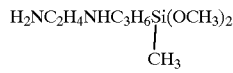

PTFE (polytetrafluoroethylene)
  KTL610 manufactured by Kitamura KK
  Average particle size: 10 μm
Graphite
  CP•B manufactured by Nippon Kokuen KK
  Average particle size: 5 μm
  (Flake natural graphite)

The components mentioned above were blended in ratios as shown on Tables I and II, and kneaded at 290° C., using a twin-screw kneading extruder; thereby, a compound was prepared in a form of pellets. A test piece was produced from the pellets using an injection molder at a molding temperature of 300° C. and a mold temperature of 140° C.

Evaluation of slidability

Figure 2:
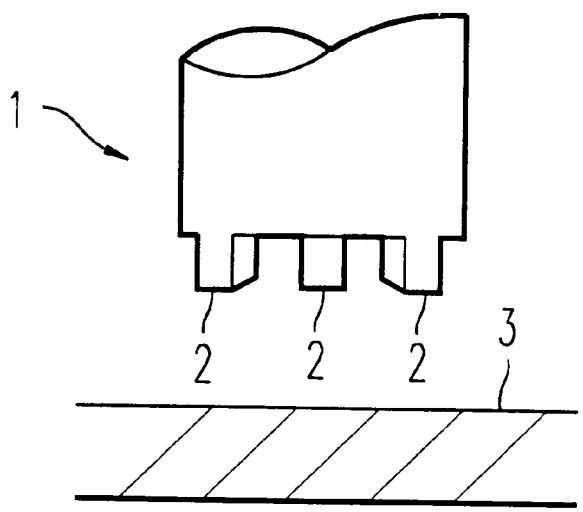
FIG. 2 shows a side view of the test ring mentioned above.

In the examples and comparative examples, slidability was evaluated by use of a friction-abrasion tester of ring-on-disc type manufactured by Tokyo Shikenki Seisakusho KK. As shown in FIG. 1 (bottom view) and FIG. 2 (side view), the test ring 1, the object to which the sample 3 was applied, was made of S45C steel. Ring 1 had an inside diameter (D1) of 23 mm and outside diameter (D2) of 20 mm. The width (W1) of the slide part 2 was 2.4 mm.

Ring 1 was pushed on to the sample piece and rotated at a speed of 300 rpm. The abrasion amount and friction coefficient were determined under a load of 20 kg. Details of the test are given hereunder.

Contact area: 0.216 cm$^2$
Rotation: 300 rpm
Speed: 33.8 cm/sec
Test load: 20 kg (surface pressure: 93 kg/cm$^2$)
Test period: 1–10 hours The friction coefficient was calculated from the load torque to the ring during test. The abrasion amount per unit period of time (abrasion resistance) was calculated from the test period and weight loss.

TABLE I

|  | Example 1 | Example 2 | Example 3 |
|---|---|---|---|
| PPS1 |  |  | 100 |
| PPS2 | 100 | 100 |  |
| MMPE1 | 20 | 6 |  |
| MMPE2 |  |  | 6 |
| Epoxy silane coupling agent 1 | 1 | 1 |  |
| Epoxy silane coupling agent 2 |  |  | 1 |
| PTFE | 30 | 30 | 25 |
| Graphite | 20 | 10 | 10 |
| Abrasion Resistance (mg/h) | 0.22 | 0.02 | 0.18 |
| Friction Coefficient | 0.1 | 0.09 | 0.11 |

TABLE II

|  | COMP. EX. 1 | COMP. EX. 2 | COMP. EX. 3 | COMP. EX. 4 | COMP. EX. 5 | COMP. EX. 6 | COMP. EX. 7 |
|---|---|---|---|---|---|---|---|
| PPS2 | 100 | 100 | 100 | 100 | 100 | 100 | 100 |
| MMPE1 |  | 6 | 6 |  |  | 80 | 6 |
| AMPE |  |  |  | 6 |  |  |  |
| HDPE |  |  |  |  | 6 |  |  |
| Epoxy Silane Coupling Agent 1 |  |  |  | 1 | 1 | 1 | 1 |
| Amino Silane Coupling Agent |  |  | 1 |  |  |  |  |
| PTFE | 30 | 30 | 30 | 30 | 30 | 30 | 25 |
| Graphite | 10 | 10 | 10 | 10 | 10 | 10 | 35 |
| Abrasion Resistance (mg/h) | 0.44 | >30* | 5.2 | 1.4 | >30* | 8.2 | >30* |
| Friction Coefficient | 0.13 | 0.15 | 0.15 | 0.2 | 0.13 | 0.12 | 0.18 |

*abnormal abrasion

As shown by the Examples, the composition according to the present invention exhibits excellent slidability with low abrasion and a small friction coefficient. The present composition is injection moldable and applicable to parts which are used under severe conditions. These demands are not satisfied by conventional resin materials.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A slidable resin composition comprising:
   (A) 100 parts by weight of polyphenylene sulfide resin;
   (B) from 1 to 70 parts by weight based on 100 parts of (A) of polyethylene graft modified with an unsaturated carboxylic acid and/or an ethylenic unsaturated carboxylic acid anhydride; and
   (C) from 0.1 to 10 parts by weight based on 100 parts of (A) of a silane coupling agent having an epoxy group; and further comprising, based on a total of 100 parts by weight of (A), (B) and (C):
   (D) from 3 to 70 parts by weight of polytetrafluoroethylene; and
   (E) from 0.1 to 30 parts by weight of graphite.

2. A slidable resin composition comprising:
   (A) 100 parts by weight of polyphenylene sulfide resin;
   (B) from 1 to 40 parts by weight based on 100 parts of (A) of polyethylene graft modified with an ethylenic unsaturated carboxylic acid and/or an ethylenic unsaturated carboxylic acid anhydride,
   (C) from 0.5 to 5 parts by weight based on 100 parts of (A) of a silane coupling agent having an epoxy group,
   (D) from 5 to 40 parts by weight based on a total of 100 parts by weight of (A), (B) and (C) of polytetrafluoroethylene; and
   (E) from 0.5 to 10 parts by weight based on a total of 100 parts by weight of (A), (B) and (C) of graphite.

3. The slidable resin composition according to claim 1, wherein the ethylenic unsaturated carboxylic acid and/or the ethylenic unsaturated carboxylic acid anhydride of (B) is selected from the group consisting of maleic acid, acrylic acid, itaconic acid, maleic anhydride, and itaconic anhydride.

4. The slidable resin composition according to claim 1 wherein the silane coupling agent having an epoxy group of (C) is represented by the formula:

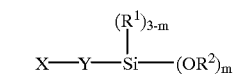

where, m is an integer from 1 to 3, X is

$R^1$ and $R^2$ are alkyl group having from 1 to 6 carbon atoms and can be the same or different, and Y represents an alkylene group having from 1 to 6 carbon atoms or a group: $-R^3-O-R^4-$, where $R^3$ and $R^4$ are an alkylene group having from 1 to 6 carbon atoms and can be the same or different.

5. The slidable resin composition according to claim 4, wherein X is

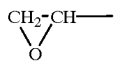

and $R^1$ and $R^2$ are an alkyl group having from 1 to 3 carbon atoms and can be the same or different.

6. The slidable resin composition according to claim 1, wherein the polyphenylene sulfide resin has a melt viscosity not less than 3,000 poises when a load of 20 kg is applied at 300° C.

7. The slidable resin composition according to claim 1, wherein the polytetrafluoroethylene is in a form of powder which has an average diameter not more than 100 µm.

8. The slidable resin composition according to claim 1, wherein the graphite is in a form of powder which has an average diameter not more than 50 µm.

9. The slidable resin composition according to claim 1, wherein the ethylenic unsaturated carboxylic acid or the ethylenic unsaturated carboxylic acid anhydride is from 0.5 to 10 parts by weight, based on 100 parts by weight of the modified polyethylene.

10. The slidable resin composition according to claim 1, wherein the ethylenic unsaturated carboxylic acid or the ethylenic unsaturated carboxylic acid anhydride is from 0.1 to 5 parts by weight, based on 100 parts by weight of the modified polyethylene.

11. The slidable resin composition according to claim 1, wherein the polyethylene modified with the ethylenic unsaturated carboxylic acid has a viscosity that has a melt flow rate of 0.01 to 100 grams per 10 minutes under 2.6 kg load at 190° C.

12. The slidable resin composition according to claim 1, wherein component (B) is present in an amount of from 1 to 40 parts by weight based on 100 parts by weight of component (A).

13. The slidable resin composition according to claim 1, wherein component (B) is present in an amount of from 3 to 30 parts by weight based on 100 parts by weight of component (A).

14. The slidable resin composition according to claim 1, wherein the polytetrafluoroethylene is in a form of powder which has an average diameter from 1 to 50 µm.

15. The slidable resin composition according to claim 1, wherein the graphite is in a form of powder which has an average diameter not more than 30 µm.

16. The slidable resin composition according to claim 1, further comprising additional components selected from the group consisting of a lubricant, a lubricant oil and a reinforcing material, in an amount such that said additional component will not impair the effect of the composition.

17. A molded article that is molded from the resin compound according to claim 1.

* * * * *